(12) United States Patent
Ehara et al.

(10) Patent No.: US 6,601,962 B1
(45) Date of Patent: Aug. 5, 2003

(54) SURFACE LIGHT EMITTING DEVICE

(75) Inventors: Munetsugu Ehara, Anan (JP); Hitoshi Nojiri, Anan (JP); Eiji Nakanishi, Anan (JP); Koichi Kunikata, Anan (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 09/567,428

(22) Filed: May 10, 2000

(30) Foreign Application Priority Data

May 11, 1999 (JP) ............................................ 11-130376
May 9, 2000 (JP) ....................................... 2000-135713

(51) Int. Cl.⁷ ................................................. F21V 8/00
(52) U.S. Cl. ......................................... 362/31; 362/558
(58) Field of Search ........................... 362/31, 555, 558

(56) References Cited

U.S. PATENT DOCUMENTS

| 6,065,846 A | * | 5/2000 | Kato et al. | 362/30 |
| 6,357,904 B1 | * | 3/2002 | Kawashima | 362/555 |
| 6,386,720 B1 | * | 5/2002 | Mochizuki | 362/27 |

FOREIGN PATENT DOCUMENTS

| JP | 60-150585 | 5/1985 |
| JP | 62-74282 | 12/1987 |
| JP | 10-199316 | 7/1998 |
| JP | 10-253957 | 9/1998 |
| JP | 10-255530 | 9/1998 |
| JP | 10-293202 | 11/1998 |
| JP | 11-203923 | 7/1999 |
| JP | 11-223805 | 8/1999 |
| JP | 11-339527 | 12/1999 |
| JP | 2000-030520 A | 1/2000 |

OTHER PUBLICATIONS

Translation of JA 10–199,316.

* cited by examiner

Primary Examiner—Laura K. Tso
(74) Attorney, Agent, or Firm—Morrison & Foerster LLP

(57) ABSTRACT

An surface light emitting device that is capable of emitting light of high luminance with higher uniformity is disclosed.

The surface light emitting device comprising; a light guide plate, a reflector on the under surface of the light guide plate and, an LED light source having at least one LED element and provided so that a light emitted by the LED element is incident on at least one end face of the light guide plate, wherein the light guide plate has a light diffusing portion on the one end face so that a light emitted from the LED light source enters the light guide plate while being diffused therein, and the light diffusing portion has the top end being space from the top surface.

29 Claims, 11 Drawing Sheets

Fig. 17  Present Invention
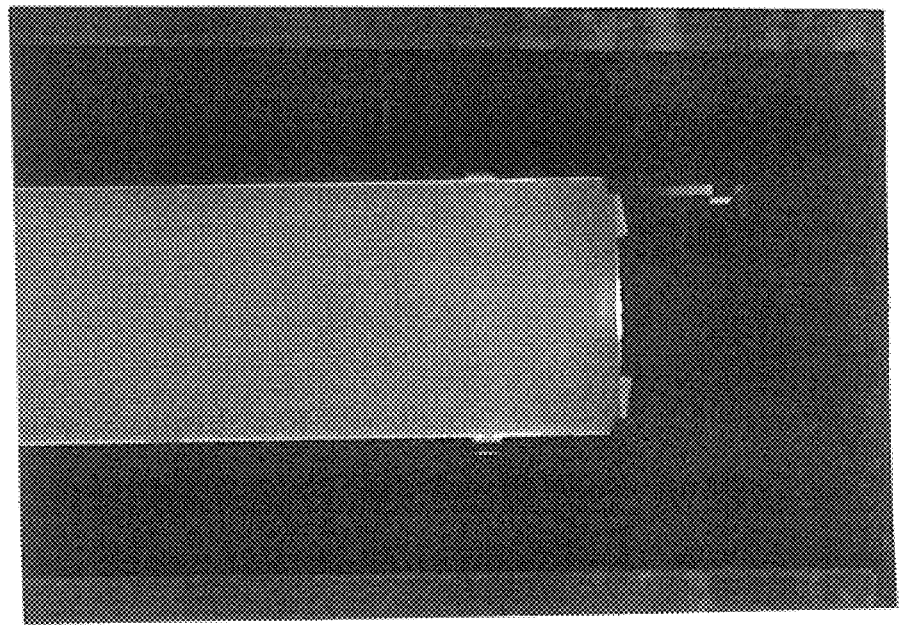
Fig. 18  Prior Art
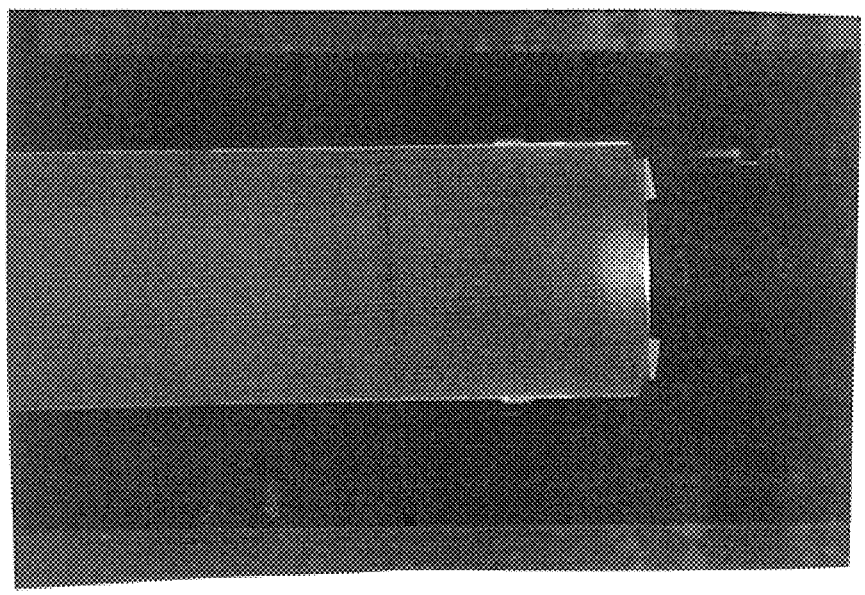

SURFACE LIGHT EMITTING DEVICE

FIELD OF THE INVENTION

The present invention relates to a surface light emitting device that is capable of emitting light, received from LED chips that are point light sources, uniformly over a light emitting surface of a light guide plate and is used for the back light of a liquid crystal display, panel meter, indicator light and surface light emitting switch.

DESCRIPTION OF THE RELATED ART

Recently surface light emitting device, that effects surface emission of light by receiving light from LED chips which are point light sources, has been used as light sources such as the back light of liquid crystal display. The surface light emitting device is made in such a configuration that light, which is emitted by one or more light emitting diodes and is incident on one end face of a light guide plate that has opposing principal planes, is caused to emerge from the entire surface of one of the principal planes of the light guide plate. In the surface light emitting device, it is important to extract uniform optical output from the light emerging plane, and various proposals have been made to achieve the uniformity of optical output. A surface light emitting device of the prior art as an example of the proposal is schematically shown in FIG. 19. The surface light emitting device shown in FIG. 19 comprises a light guide plate 901 that has a first principal plane and a second principal plane and is made of a light transmitting resin capable of transmitting light, a molded LED 902 that is disposed to oppose an end face of the light guide plate 901 and includes an LED element molded therein, and a reflector 904 mounted on the second principal plane of the light guide plate to reflect light so that the light emerges from the first principal plane.

In the surface light emitting device shown in FIG. 19, a notch of semi-cylindrical shape 911 is formed on the input end face of the light guide plate 901 so that light is diffused uniformly in a plane parallel to the principal plane of the light guide plate 901, thereby to cause the light entering from the LED element to be emitted from the first principal plane uniformly.

However, in the surface light emitting device of the prior art shown in FIG. 19, there has been such a problem that luminance becomes extremely high in the vicinity of the notch 911 in the first principal plane of the light guide plate.

Also in the surface light emitting device of the prior art shown in FIG. 19, although optical output is made uniform to some extent by the notch 911, it has not been sufficient.

SUMMARY OF THE INVENTION

An object of the present invention is to solve the problems described above and provide a surface light emitting device that is capable of emitting light of high luminance with higher uniformity.

The inventors of the present application conducted various experiments and researches and found that light incident on an end face of a light guide plate can be diffused more uniformly in a light guide plate by forming a light diffusing portion of a predetermined configuration on the end face of the light guide plate, thus completing the present invention.

The surface light emitting device of the present invention comprises a light guide plate having a top surface and an under surface that oppose each other, a reflector installed on the under surface of the light guide plate and an LED light source that comprises at least one LED element so that light emitted by the LED element is incident on one end face of the light guide plate, thereby to cause the light to emerge from the top surface of the light guide plate, characterized in that:

the light guide plate has such a light diffusing portion on the one end face described above, that the light emitted from the LED light source enters the light guide plate while being diffused therein, and the light diffusing portion has the top end being formed to be space from the top surface at the one end.

In the surface light emitting device made in such a configuration as described above, since the light diffusing portion is formed to be space from the top surface of the light guide plate at the one end of the light guide plate so that an opening is not formed on the top surface of the light guide plate, light is prevented from leaking through the top surface of the light guide plate and uniform surface light emission without abnormal light emission can be achieved.

The top surface f the light guide plate refers to the surface through which the light is emitted, and the under surface refers to the surface opposite to the light emitting surface.

In the surface light emitting device of the present invention, the light diffusing portion is preferably a notch made in a shape of half pyramid or half circular cone expanding downward from an apex located below the top surface on the one end face, in order to cause the incident light to be emitted from the top surface of the light guide plate efficiently.

In the surface light emitting device of the present invention, the notch is preferably made in a triangular pyramid shape.

Also in the surface light emitting device of the present invention, the notches are preferably formed in plurality for every LED element, in order to cause the light from the LED light source to be emitted from the top surface of the light guide plate efficiently.

In the surface light emitting device of the present invention, adjacent notches among the plurality of notches formed for every LED element may be formed to be spaced from each other at the under surface of the light guide plate.

With such a configuration as described above, relatively large flat areas can be formed between the notches. This causes a part of the incident light that enters the notches to be diffused and other part of light incident on the flat surface to be transmitted forward, thus making it possible to effect uniform surface light emission over the surface in the surface light emitting device of relatively long configuration.

Moreover, in the surface light emitting device of the present invention, it is preferable that the notch has a shape of triangular pyramid having two inclined surfaces, and that the inclined surfaces that constitute at least two notches among the notches described above are formed with different angles with respect to the one end described above, so that the light from the LED light source enters the light guide plate while being more diffused.

In the surface light emitting device of the present invention, the light diffusing portion may also be formed in such a configuration as the top end and the bottom end of the light diffusing portion are located away from the top surface and the under surface at the one end face, in order to prevent leakage of the light from the LED light source through the top surface and the under surface of the light diffusing portion.

In the surface light emitting device of the present invention, inner surface of the light diffusing portion may also be a curved surface.

In the surface light emitting device of the present invention, inner surface of the light diffusing portion may also be a spherical surface.

In the surface light emitting device of the present invention, the light diffusing portion may also be made in a semi-cylindrical shape.

In the surface light emitting device of the present invention, the LED element may also be covered by a light transmitting resin.

The surface light emitting device of the present invention may also comprise an LED bar light source having a surface located to oppose the one end face described above of the light guide plate and a light emitting portion that has a concave shape formed in the surface where the LED element is mounted and is filled with a light transmitting resin. In this case, the light diffusing portion is located to oppose the light emerging surface of the light emitting portion.

In the surface light emitting device of the present invention, the LED bar light source may also have a plurality of light emitting portions. This makes it possible for the surface light emitting device to emit light of sufficient luminance from a surface of wide area.

Further in the surface light emitting device of the present invention, the light transmitting resin may include a fluorescent matter that absorbs light emitted by the LED element and emits light of a wavelength different from that of the absorbed light.

Also in the surface light emitting device of the present invention, the LED element may be a light emitting element that is capable of emitting visible light and the fluorescent matter may be a phosphor that absorbs the visible light emitted by the light emitting element and emits visible light of a wavelength longer than that of the light absorbed. With this constitution, the emitted light can be rendered a desired color tone by a proper combination of the LED element and the fluorescent substance.

Also in the surface light emitting device of the present invention, the light emitting portion may be made in such a constitution as white light generated by mixing the light emitted by the LED element and the light emitted by the fluorescent substance is output from the light emerging surface.

The surface light emitting device may also be made in such a constitution as the LED element is an LED that includes a nitride semiconductor, and the fluorescent substance is a yttrium-aluminum-garnet fluorescent substance activated with cerium, so that white light is output from the light emerging surface.

BRIEF DESCRIPTION OF THE DRAWINGS

FIG. 17 shows the state of light emission in the light emitting surface of the light guide plate 1 of the surface light emitting device of the first embodiment.

FIG. 18 shows the state of light emission in the light emitting surface of the light guide plate of the surface light emitting device shown in FIG. 19 (prior art).

PREFERRED EMBODIMENTS OF THE INVENTION

Figure 1:
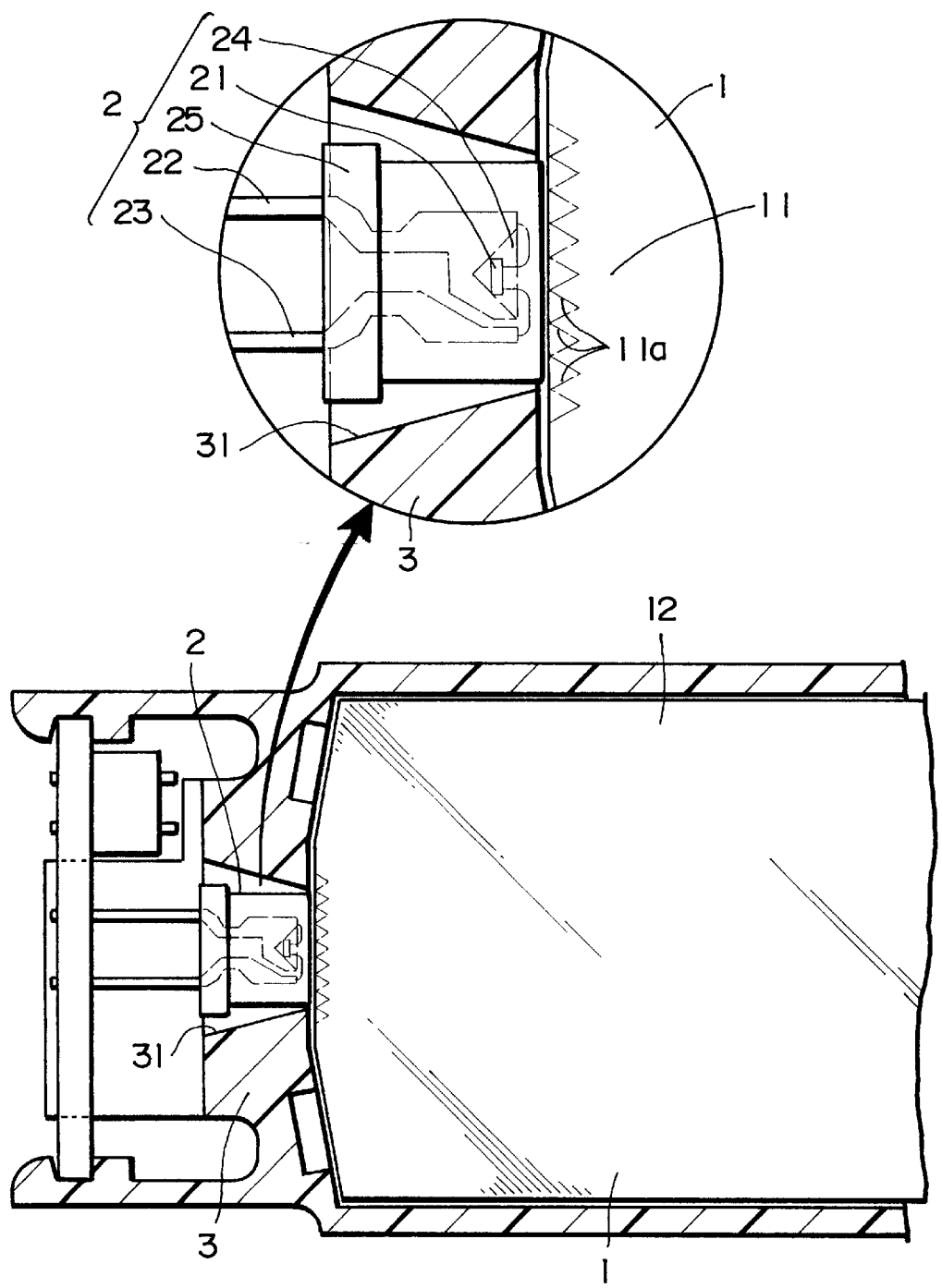
FIG. 1 is a plan view of a surface light emitting device according to the first embodiment of the present invention.

The surface light emitting device of the present invention introduces light emitted by an LED light source into a light guide plate, and effects surface emission of light. In the surface light emitting device, shape of the light guide plate can be determined according to the application and purpose of the device. For the use as the back light of liquid crystal display of personal computer or the like, for example, a light guide plate of substantially rectangular plate shape is used, and for the use as the back light of panel meter of automobile, a light guide plate made in a shape that matches the panel is used.

Now the surface light emitting device according to preferred embodiments of the present invention will be described below with reference to the accompanying drawings.

Embodiment 1

The surface light emitting device according to the first embodiment of the present invention comprises a light guide plate 1 having a reflector 4 provided on the under surface, that is one of opposing principal planes, and the other principal plane serving as a light emitting surface 12, an LED light source 2 having a light emerging surface disposed to oppose an incidence surface that is one end face of the light guide plate 1, and a support 3 that is made of a molded resin and holds the light guide plate 1 and the LED light source 2 in a predetermined positional relationship.

The surface light emitting device according to the first embodiment is particularly characterized in that a light diffusing portion 11 having a plurality of notches of triangular cone shape 11a is formed at such a position that opposes a light emerging surface 26 of the LED light source 2 in the light input end face of the light guide plate 1. This configuration makes it possible to suppress the abnormal light emission in the vicinity of the light diffusing portion 11 in the light emitting surface 12 of the light guide plate 1, and improves the uniformity of the light intensity distribution in the light emitting surface 12.

Figure 3:
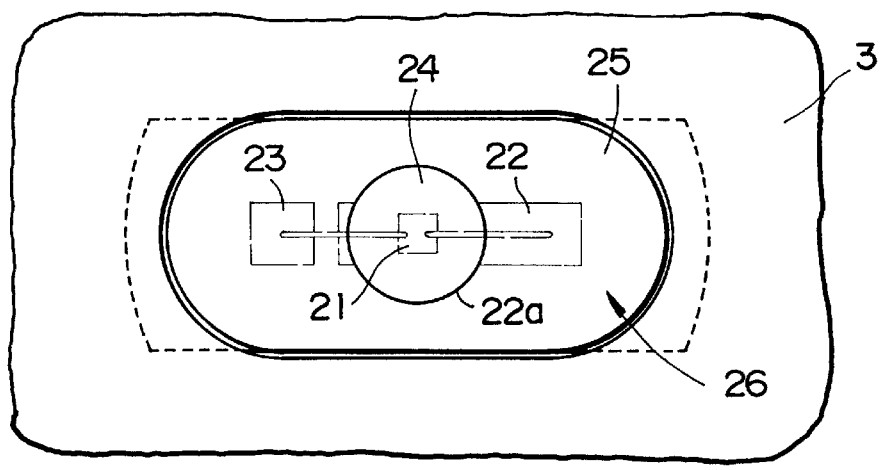
FIG. 3 is a front view of an LED light source of the first embodiment.

In more detail, the surface light emitting device according to the first embodiment has such a configuration as the LED light source 2 has an LED chip (LED element) 21 mounted in a cup 22a that is formed at an end of a lead frame 22 as shown in FIG. 1 and FIG. 3, with a light transmitting resin 24 that includes a phosphor filling the inside of the cup, with the entire body being molded with a light transmitting resin 25.

The light transmitting resin 25 is molded to have a flat light emerging surface 26 as shown in FIG. 3. One of positive and negative electrodes of the LED chip 21 is connected to the lead frame 22 and the other electrode is connected to a lead frame 23 provided near the lead frame 22.

Figure 2:
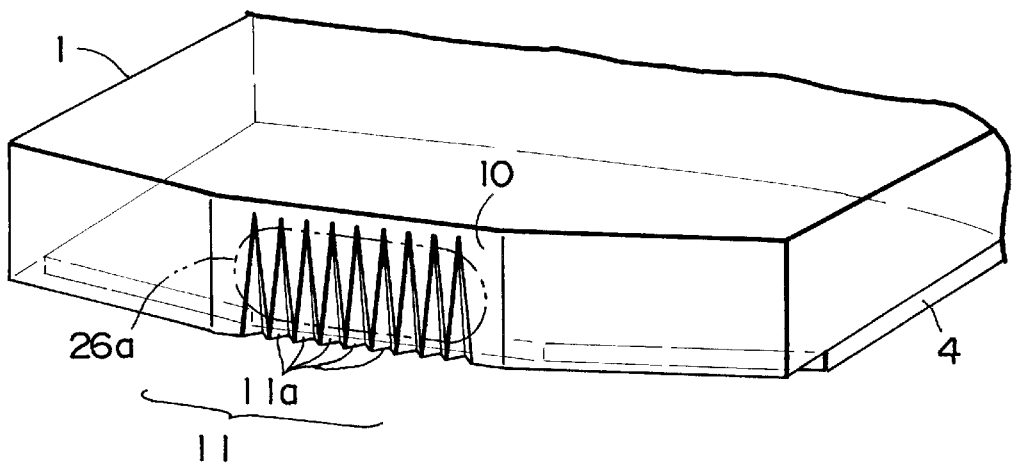
FIG. 2 is a perspective view of a light guide plate of the first embodiment.

According to the first embodiment, the light transmitting resin used to make the light guide plate 1 is molded by, for example, injection molding, with a plurality of notches of triangular cone shape 11a being formed on one end face 10 thereof as shown in FIG. 2, thereby constituting the light diffusing portion 11 from the plurality of notches 11a. The notches 11a are made in a shape of triangular pyramid expanding from an apex located at a position spaced from the light emitting surface 12 on the end face 10 of the light guide plate 1 downward to the under surface where the reflecting surface 4 is formed.

A portion enclosed by a dash and two dots line with reference numeral 26a in FIG. 2 is the portion that is to oppose the light emerging surface 26 of the LED light source 2 in the end face 10.

In the first embodiment, the support 3 holds the LED light source 2 and the light guide plate 1 which are positioned so that the light emerging surface 26 of the LED light source 2 and the light diffusing portion 11 of the light guide plate 1 are located in proximity and oppose each other as shown in FIG. 1. An element seat 31 of the support 3 where the LED light source 2 is to be located is formed so that an opening thereof has a substantially the same shape as the light emerging surface 26 of the LED light source 2, thereby to prevent light that has leaked through a portion other than the light emerging surface 26 of the LED light source 2 from entering the light guide plate 1 through a portion other than the light diffusing portion 11. Thus the element seat 31 allows proper positioning of the LED light source 2 and, at the same time, restricts the light path so that light emitted by the LED light source 2 is incident on the light guide plate 1 only through the light diffusing portion 11.

In the surface light emitting device of the first embodiment made in the constitution described above, the light diffusing portion 11 of the light guide plate 1 comprises a plurality of notches of triangular cone shape 11a, and therefore the following effects are obtained.

Since the notch of triangular cone shape 11a has two surfaces that are inclined with respect to the end face 10 (hereinafter called the first inclined surface and the second inclined surface), light that is incident on the first inclined surface and the second inclined surface with an angle of incidence (the angle between the light propagating direction and the normal direction of the surface) that is smaller than a certain angle (angle of total reflection) enters the light guide plate 1 with an angle of refraction that corresponds to the angle of incidence. At this time, since the first inclined surface and the second inclined surface are inclined inwardly from the end face 10, light incident from the first inclined surface and the second inclined surface enters the light guide plate 1 while being diffused in the direction of side face of the light guide plate 1 corresponding to the angle of inclination.

Light that is incident on one of the first inclined surface and the second inclined surface with an angle of incidence that is larger than the angle of total reflection is reflected thereon and enters the light guide plate 1 through the other one of the first inclined surface and the second inclined surface.

Figure 8A:
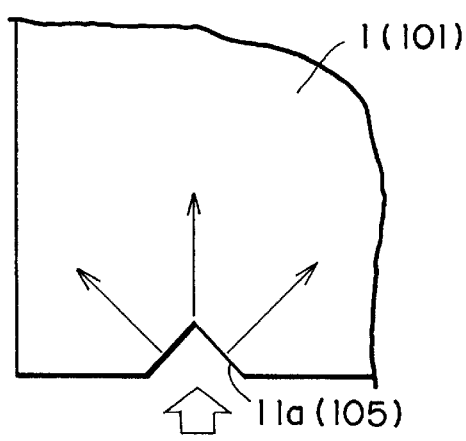
FIG. 8(a) is a schematic cross sectional view for explaining the refraction of light in the light diffusing portion of the surface light emitting device of the present invention.

Thus light incident on the light diffusing portion 11 enters the light guide plate 1 while being diffused as schematically shown in FIG. 8(a), so that uniformity of luminance of light emitted from the light emitting surface 12 of the light guide plate 1 can be improved.

Figure 8B:
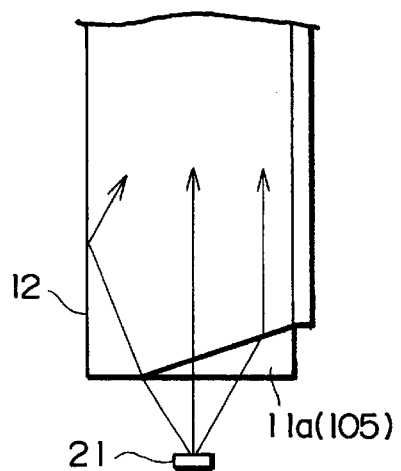
FIG. 8(b) is a schematic longitudinal sectional view for explaining the refraction of light in the light diffusing portion of the surface light emitting device of the present invention.

Also in the surface light emitting device of the first embodiment, the notches 11a are made in a shape of triangular pyramid expanding from the apex located at a position spaced from the light emitting surface 12 on the end face 10 of the light guide plate 1 downward to the under surface where the reflecting surface 4 is formed. Thus since the notches 11a do not have opening in the light emitting surface 12, light emerging from the light emitting element 2 can be prevented from emerging directly from the light emitting surface as shown in FIG. 8(b).

With this configuration, such an abnormal light emission can be prevented as light leaks through a clearance (opening) formed between the light guide plate and the LED and is seen as being extremely bright only in this portion.

Also because the notch 11a is formed in a shape of triangular pyramid that expands downward, the first and second inclined surfaces are formed to face downward, thereby to cause light incident on the end face of the light guide plate 1 at right angles to refract downward. Thus since the light incident on the end face 10 of the light guide plate 1 at right angles can be reflected on the reflector 4 that is provided on the under side of the light guide plate to be extracted upward through the light emitting surface 12, more effective optical output can be obtained from the light emitting surface 12.

With the configuration of the prior art, light incident on the end face 10 of the light guide plate 1 at right angles, that has a relatively high intensity, propagates within the light guide plate in a direction parallel to the light emitting surface and is output from the other end, resulting in a higher proportion of light not utilized effectively.

When the first and second inclined surfaces are formed to face downward as in the first embodiment, on the contrary, light incident on the end face 10 of the light guide plate 1 at right angles can be caused to refract in a direction toward the reflector 4 that is provided on the under side of the light guide plate to enter therein, and the light reflected on the reflector 4 can be output through the light emitting surface.

The surface light emitting device of the first embodiment shown in FIG. 17 can provide uniform light emission over the light emitting surface without such abnormal emission as a part of the light emitting surface 12 shows unusually high brightness. Also because light emitted by the LED light source can be caused to enter the light guide plate 1 without leaking to the outside, light can be utilized efficiently and the luminance of the entire surface can be increased.

FIG. 18 shows the state of light emitted from the light emitting surface when the light guide plate of the prior art is used. In FIG. 18, abnormal light emission is conspicuously observed near the light diffusing portion of the light guide plate.

Embodiment 2

Now a surface light emitting device of the second embodiment of the present invention will be described below.

Figure 4:
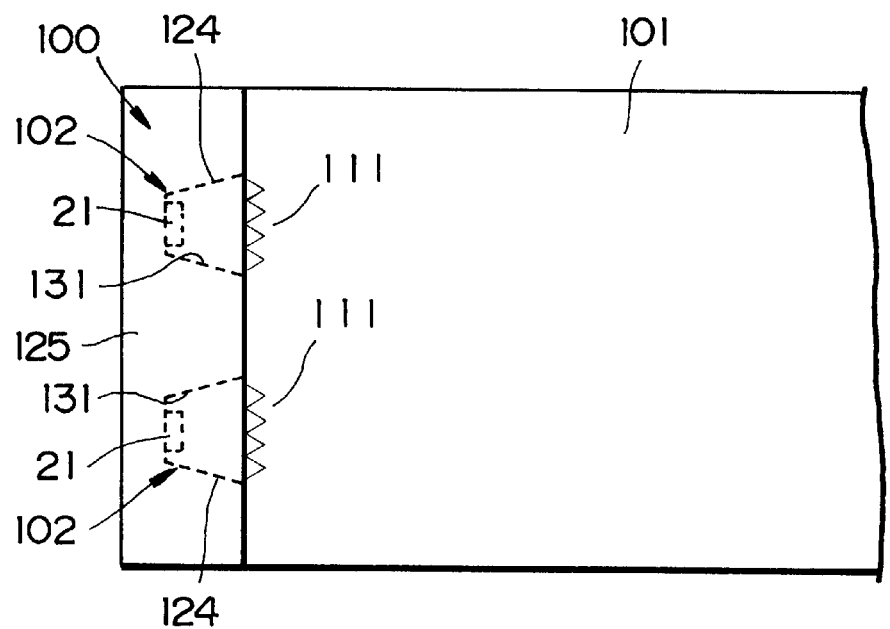
FIG. 4 is a plan view of a surface light emitting device according to the second embodiment of the present invention.

The surface light emitting device of the second embodiment comprises an LED bar light source 100 and a light guide plate 101 as shown in FIG. 4.

Figure 5:
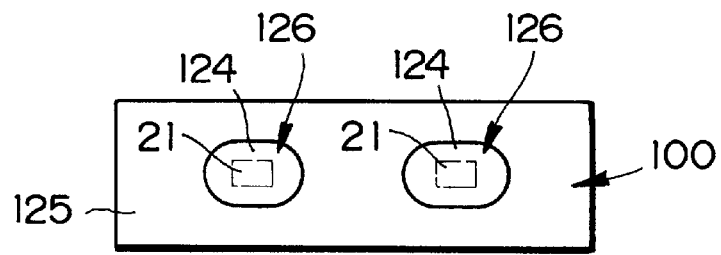
FIG. 5 is a front view of an LED bar light source of the second embodiment.

In the second embodiment, the LED bar light source 100 has a plurality of light emitting portions 102 as shown in FIG. 4 and FIG. 5, and the light emitting portions 102 are made by mounting LED chips 21 in recesses 131 formed on a side face of a bar body 125 made of a resin for injection molding, and filling the recesses with a light transmitting resin 124.

The light transmitting resin 124 include a phosphor that absorbs light emitted by the LED chip 21 and emits light of a wavelength different from that of the light absorbed, so that light of desired color is emitted from the light emerging surface 126 by mixing the light emitted by the LED chip 21 and light emitted by the fluorescent substance.

Figure 6:
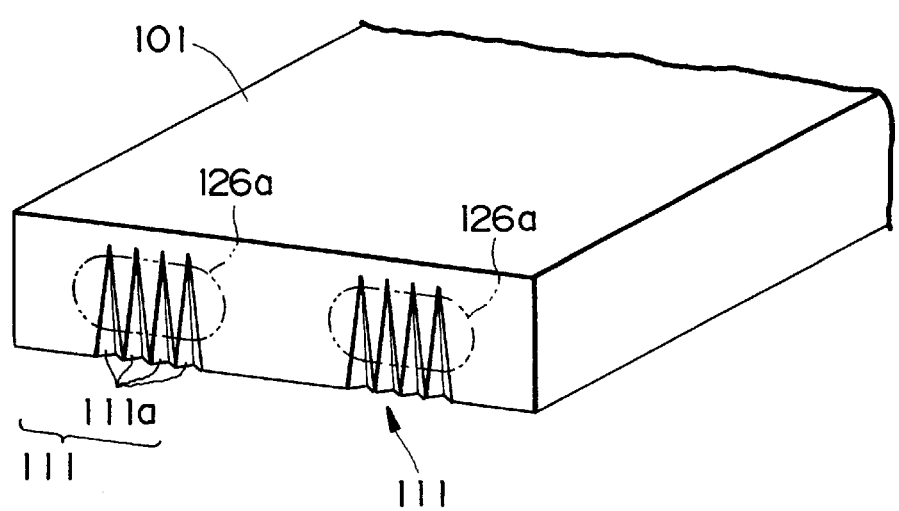
FIG. 6 is a perspective view of a light guide plate of the second embodiment.
Figure 7:
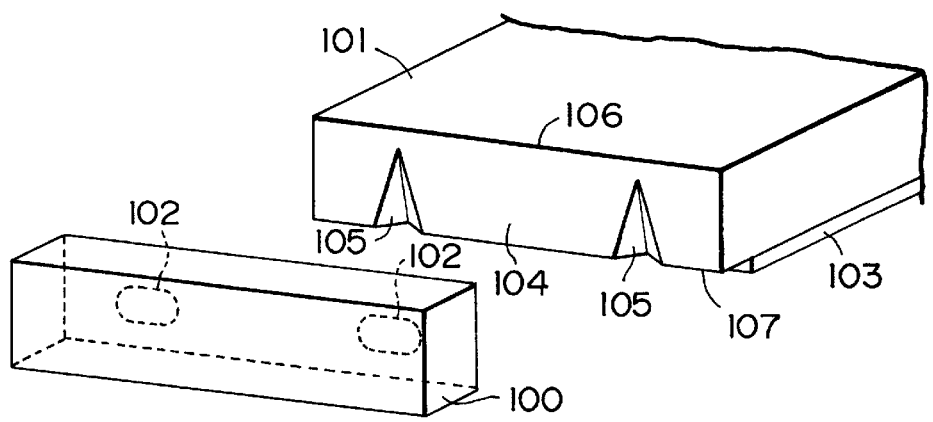
FIG. 7 is an exploded perspective view of a surface light emitting device of the first modification of the present invention.

In the surface light emitting device of the second embodiment, the light transmitting resin of the light guide plate 101 is molded by, for example, injection molding, with one end face thereof being disposed to oppose a side face whereon the plurality of light emitting portions 102 of the LED bar light source 100 are formed. A plurality of notches 111*a* having shape of triangular pyramid are formed on one end face of the light guide plate 101 in a portion that opposes the light emitting portions 102 as shown in FIG. 6, thereby to form two light diffusing portions 111 each consisting of a plurality of notches 111*a*. A portion enclosed by a dash and two dots line with reference numeral 126*a* in FIG. 6 is the portion that is to oppose the light emerging surface 126 of the light emitting portion 102.

The notches 111*a* of the second embodiment are formed in a shape of triangular pyramid expanding from an apex located at a position spaced from the top surface that is a light emitting surface on one end face of the light guide plate 101 downward to the under surface where the reflecting layer is formed, similarly to the first embodiment.

With the surface light emitting device of the second embodiment having the configuration described above, the light emitting surface of larger area can be formed since effects similar to those of the first embodiment can be achieved and the plurality of light emitting portions 102 are provided.

Although two light emitting portions 102 are shown in FIG. 4 and other drawings, the present invention is not limited to this configuration and the LED bar light source may have more than two light emitting portions.

MODIFICATIONS

Now modifications of the present invention will be described below.

Modification 1

A surface light emitting device of the first modification of the present invention is made in the same constitution as the surface light emitting device of the second embodiment except for the light guide plate 101 where the light diffusing portion is constituted from one notch 105 of triangular pyramid shape instead of the plurality of notches 111*a*.

The notch 105 of triangular pyramid shape in the surface light emitting device of the first modification is formed to be larger than the notches 11*a*, 111*a* of the first and second embodiments.

In the surface light emitting device of the first modification, the notch 105 is made in a shape of triangular pyramid that expands from an apex located at a point spaced from the light emitting surface on the end face of the light guide plate 101 downward to the under surface where the reflecting surface 4 is formed.

In the surface light emitting device of the first modification made in the constitution described above, since the notch 105 has two surfaces that are inclined with respect to the end face 10, light incident from the two inclined surfaces enters the light guide plate 1 while being diffused in the direction of side face of the light guide plate 101 (FIG. 8(*a*)) as described in the first embodiment.

Consequently, uniformity of luminance of light emitted from the light emitting surface of the light guide plate 101 can be improved also when the light guide plate 101 having the single notch 105 is used.

Also because the notch 105 does not have an opening in the light emitting surface 12, light emerging from the light emitting portion 102 can be prevented from being emitted directly from the light emitting surface 12, as shown in FIG. 8(*b*).

As a result, such an abnormal light emission experienced in the prior art can be prevented that light leaks through a clearance (opening) formed between the light guide plate and the LED and is seen as extremely bright only in this portion.

Also because the notch 105 is formed in a shape of triangular pyramid that expands downward, the two inclined surfaces are formed to face downward and the light incident on the end face 104 of the light guide plate 101 at right angles can be caused to refract downward. Thus since the light incident on the end face 104 of the light guide plate 101 at right angles can be reflected on the reflector 103 that is provided on the under side of the light guide plate to be extracted upward through the light emitting surface, more effective optical output can be obtained from the light emitting surface.

As described above, although the surface light emitting device of the first modification according to the present invention has the effects similar to those of the first and second embodiments, there are differences in the effects as described below.

(1) Since the surface light emitting device of the first modification has only one notch 105 in the light guide plate 101, structure of the metal mold used to make the light guide plate 101 can be simplified and the cost thereof can be reduced. Thus the light guide plate 101 can be made at lower cost.

(2) Since the surface light emitting device of the first modification has only one notch 105 in the light guide plate 101, it is necessary to form the notch 105 to be larger than the notches 11a, 111a of the first and second embodiments. This results in higher intensity of light leaking through the space of the notch 105 to below the light guide plate 101. Therefore, for the purpose of extracting the light emitted by the light source efficiently from the light emitting surface, the constitutions of the first and second embodiments where the light diffusing portion comprises a plurality of notches are more advantageous.

(3) The notch of triangular pyramid shape may function as an optical prism to disperse the light received from the light source into different colors ranging from blue to yellow. With this regard, the constitutions of the first and second embodiments where the optical input section consists of a plurality of notches is capable of substantially eliminating the light dispersion as light that has entered while being dispersed by one notch is mixed with the light that has entered while being dispersed by other notch. Therefore, for applications where the dispersion of light is undesirable, the constitutions of the first and second embodiments where the light diffusing portion comprises a plurality of notches are more advantageous.

While the effect of diffusing light is determined by the shape of the notch, forming a plurality of notches for every LED makes it possible to change the number of notches for improving the effect of diffusion.

Modification 2

Figure 9:
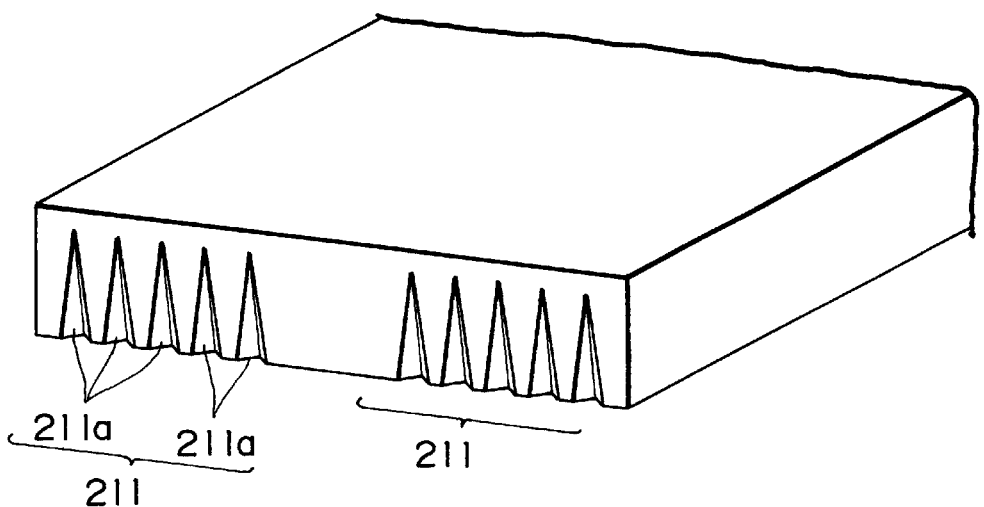
FIG. 9 is a perspective view of a light guide plate of a surface light emitting device of the second modification of the present invention.

Although the adjacent notches 11a, 111a of the first and second embodiments are formed to touch each other on the under surface of the light guide plates 1 and 101, the present invention is not limited to this configuration and the adjacent notches may open on the under surface while being separate from each other as shown in FIG. 9.

Thus the surface light emitting device can be made in such a configuration as light enters the light guide plate after being diffused most efficiently in the entire light diffusing portion including the area and shape of the flat surface left between the adjacent notches.

For example, when a flat surface wider than in the first and second embodiments is provided between adjacent notches 211a, as shown in FIG. 9, light incident on the notches 211a can be diffused to illuminate the corner on the incidence surface side, and light incident on the flat surface can be propagated toward the end face on opposite to the incidence surface, thereby making possible to suppress the decrease in the luminance in portions away from the LED.

Modification 3

When the plane of incidence is formed from a plurality of notches, the notches may have shapes different from each other.

When a plurality of notches of triangular pyramid shape each consisting of two planes are provided, for example, angles of the side walls of the notches may be changed with the distance from the light source, namely the LED chip.

Figure 10:
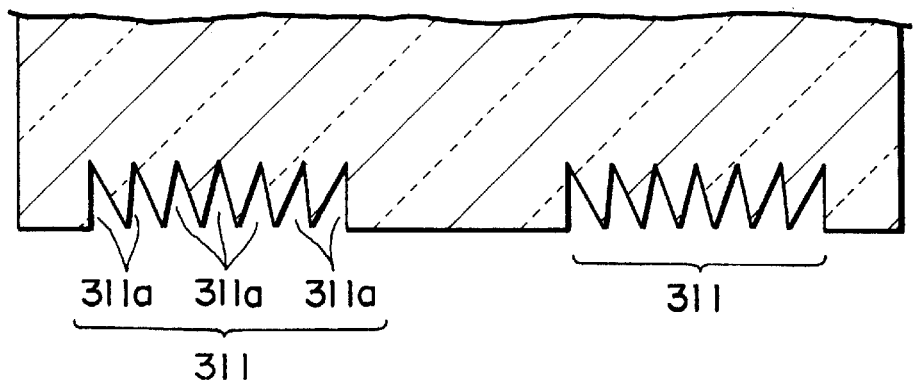
FIG. 10 is a sectional view of a light guide plate of a surface light emitting device of the third modification of the present invention.

In the example shown in FIG. 10, the notch 311a located in the middle of the light diffusing portion opposite to the LED element is formed with almost the same angles with respect to the end face of the light guide plate, while the angle between the outer side wall of the notch 311a and the end face of the light guide plate increases to approach 90° as the distance from the center increases, and the angle between the inner side wall of the notch 311a and the end face of the light guide plate decreases. With this configuration, since light can be diffused wider, light can be propagated to the corner of the incidence surface. This configuration is therefore advantageous in such a case as a relatively wide light guide plate is used.

In the third modification described above, the angle of the side wall of the light diffusing portion 311 changes with the distance from the notch 311a located at the center, although the present invention is not limited to this configuration and the angle may be changed randomly.

Also FIG. 10 shows the inclined surfaces of all of the plurality of notches 311a that constitute the light diffusing portion 311 being formed to have different angles (any two notches 311a selected arbitrarily have inclined surfaces of angles different from each other), although the third modification is not limited to this configuration.

That is, according to the present invention, similar effects to those of the third modification can be achieved when the inclined surfaces of at least two of the plurality of notches 311a are formed to have different angles with respect to the end face.

Modification 4

Figure 11:
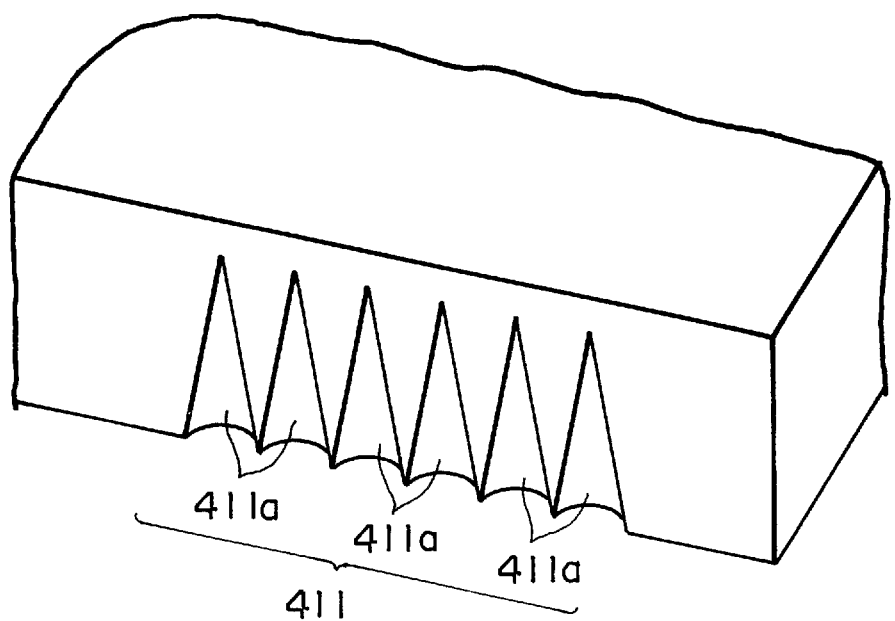
FIG. 11 is a perspective view of a light guide plate of a surface light emitting device of the fourth modification of the present invention.

While the surface light emitting devices of the first and second embodiments have notch of triangular pyramid shape formed thereon, the present invention is not limited to the notch of triangular pyramid one shape. As shown in FIG. 11, a light diffusing portion 411 may also be formed with a notch of semi-circular cone shape 411a.

This configuration can also achieve the effects similar to those of the first and second embodiments.

However, since the opening of the notch of semi-circular cone shape 411a formed in the under surface of the light guide plate has an area slightly larger than that of the notch of triangular pyramid shape, somewhat larger amount of light leaks through this portion.

Modification 5

Figure 12:
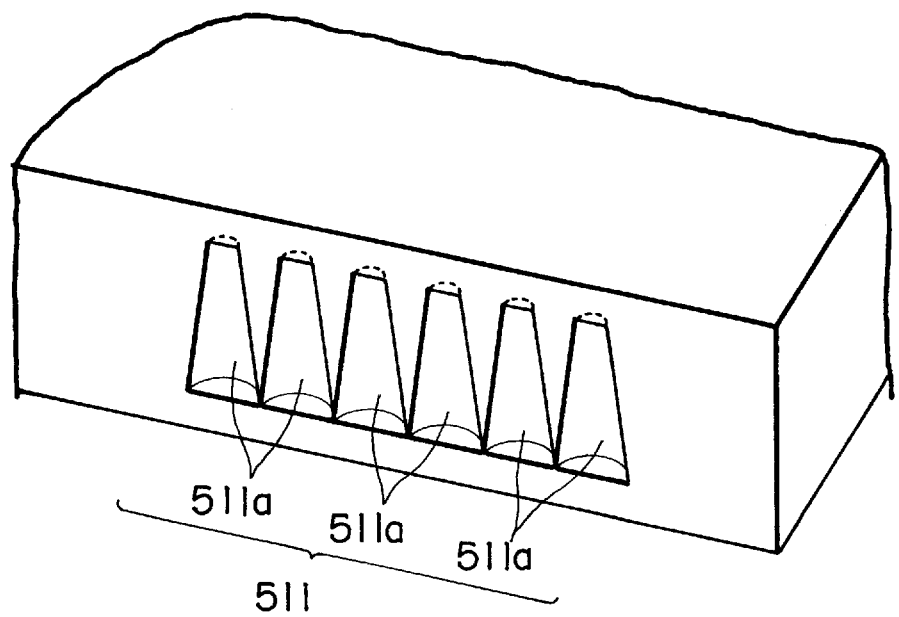
FIG. 12 is a perspective view of a light guide plate of a surface light emitting device of the fifth modification of the present invention.

The surface light emitting device of the present invention may also have a light diffusing portion 511 formed with a notch of semi-circular cone shape 511a as shown in FIG. 12.

This configuration can also achieve the effects similar to those of the first and second embodiments.

In the fifth modification, the notch 511a of truncated semi-circular cone shape has the top surface thereof being formed at a distance from the top surface (light emitting surface) of the light guide plate, and the under surface thereof is also formed at a distance from the under surface of the light guide plate.

Since the notch 511a formed as described above does not have the opening in the top surface (light emitting surface) nor in the under surface of the light guide plate, abnormal illumination in the light emitting surface of the light guide plate can be prevented and leak of light from the under surface of the light guide plate can be prevented.

Modification 6

Figure 13:
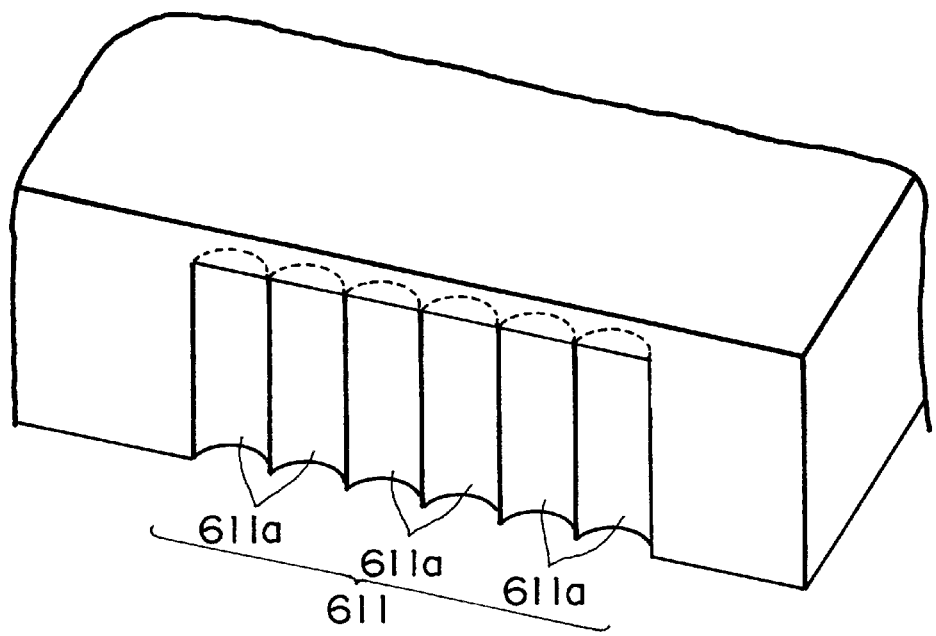
FIG. 13 is a perspective view of a light guide plate of a surface light emitting device of the sixth modification of the present invention.

The surface light emitting device of the present invention may also have a light diffusing portion 611 formed with a notch 611a having semi-cylindrical shape as shown in FIG. 13.

The notch 611a has a top end face that is substantially parallel to the light emitting surface of the light guide plate, and opens only in the under surface of the light guide plate.

Figure 14:
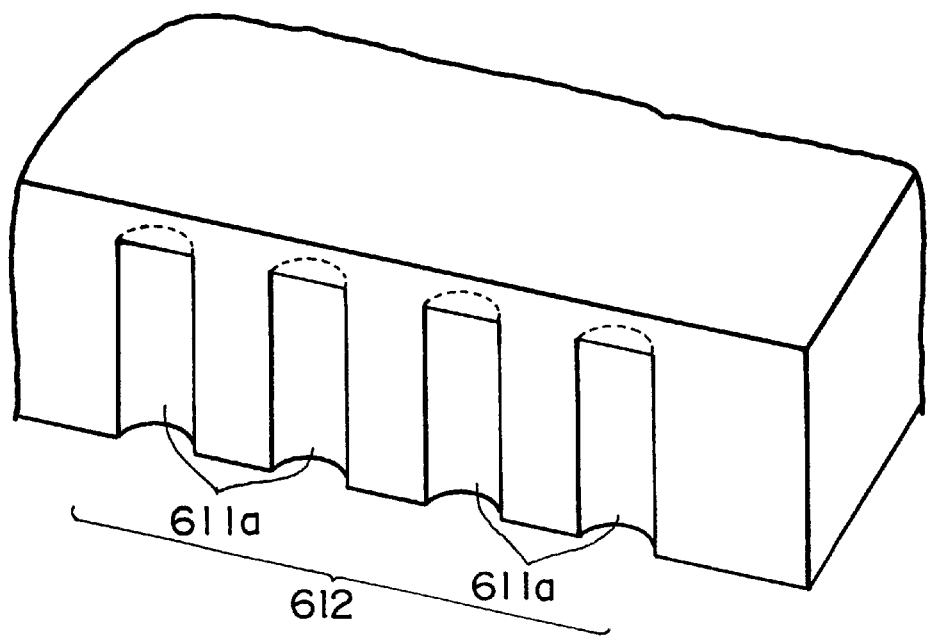
FIG. 14 is a perspective view of a light guide plate having different structure from that of FIG. 13 of the surface light emitting device of the second modification of the present invention.

Although the adjacent notches 611a are formed to touch each other on the under surface of the light guide plate in the sixth modification, the present invention is not limited to this configuration and a light diffusing portion 612 may be formed so that the adjacent notches open while being separate from each other, as shown in FIG. 14.

This configuration can also achieve the effects similar to those of the first and second embodiments.

Modification 7

Figure 15:
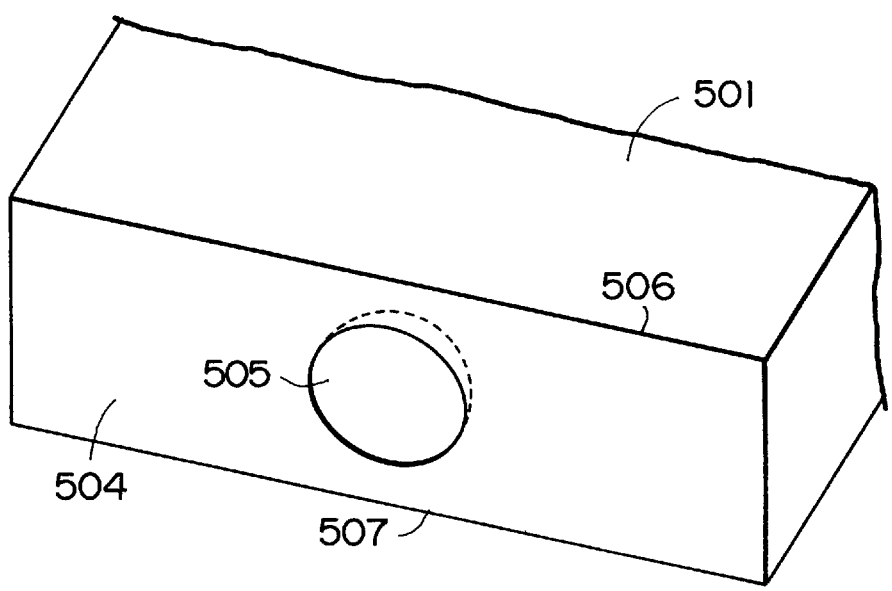
FIG. 15 is a perspective view of a light guide plate of a surface light emitting device of the seventh modification of the present invention.

Although the notches 11a, 111a are formed in the first and second embodiments, the present invention is not limited to this configuration and a semi-spherical recess 505 may be formed in the end face 504 of the light guide plate 501, as shown in FIG. 15.

In the seventh modification, the recess 505 is formed to have the top end and the bottom end thereof both being formed at a distance from the top end 506 and the bottom end 507 of the end face 504.

With this configuration, since light emitted from the LED light source does not leak directly from the light emitting surface (top surface) of the light guide plate, abnormal illumination in the light emitting surface can be prevented.

Figure 16:
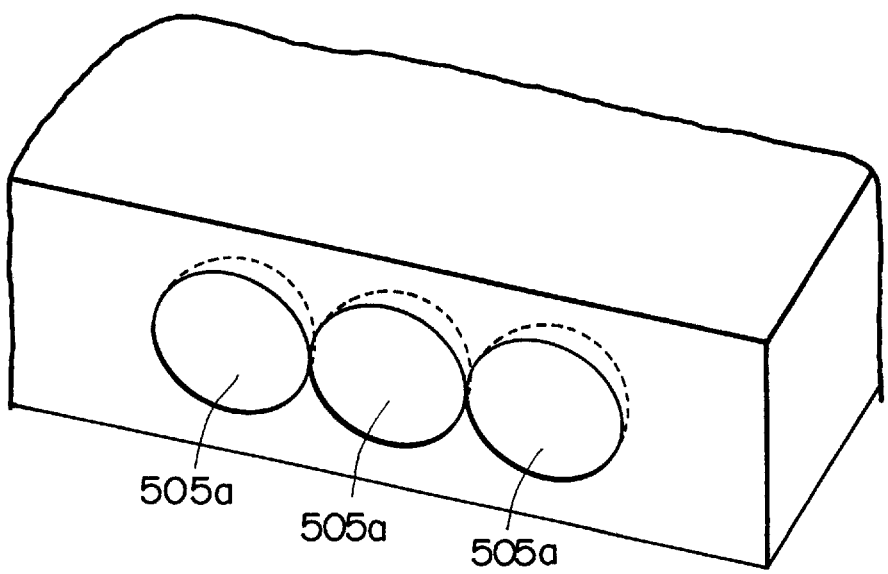
FIG. 16 is a perspective view of a light guide plate having different structure from that of FIG. 15 of the surface light emitting device of the seventh modification of the present invention.

In the seventh modification, since light does not leak directly from the under surface of the light guide plate, too, the incident light can be emitted from the light emitting surface efficiently in the light guide plate Also in the seventh modification, as shown in FIG. 16, a plurality of semi-spherical recesses 505a may be formed.

As described in detail in conjunction with the first and second embodiments and the first through seventh modifications, minimum conditions of the surface light emitting device of the present invention are to form one or more notches or recesses on the end face of the light guide plate and the top end of at least the notch or recess is formed at a distance from the light emitting surface, thereby to enter the incident light while being diffused in the light guide plate and preventing abnormal light emission in the light emitting surface.

In this specification, the notch and the recess are collectively referred to as light diffusing portion.

According to the present invention, the notch or the recess may be formed in various shapes including cone, cylinder or cone truncated by a plane or a curved surface, as long as the minimum conditions described above are satisfied. The cone here refers to a solid formed by a region enclosed in a closed curve in a plane and segments joining the points of the closed curve and a point (apex) not lying in the plane, such as circular cone and polygonal cone. The apex may be on the end face of the light guide plate or inside or outside of the end face of light guide plate. The cylindrical shape refers to a solid delimited by two planes enclosed by closed curves and parallel segments joining points on both curves, such as circular cylinders and polygonal cylinders.

The surface light emitting device of the present invention can be constituted by selecting the best shape for the shape of the light guide plate from among the light diffusing portions f various shapes, so that the incident light is diffused more effectively. In this case, light is reflected in a more complicated way and uniformity of luminance can be improved as the number of light diffusing portions is increased and accordingly the number of planes is increased.

However, it leads to more complicated structure of the metal mold, and may result in such a problem as stable shape of the end face of light guide plate cannot be obtained when fabricated using the metal mold. Therefore, it is preferable to select the shape by taking into consideration the producing conditions as well as the specification requirements set for the application.

Since the present invention allows it to select various shapes, whether the light diffusing portion is to be made in the form of notch or recess can be determined on the basis of total consideration of the target performance, restrictions on the fabrication of the metal mold (machining accuracy, production cost, etc.) and injection molding accuracy.

Now preferable materials for various components of the surface light emitting device of the present invention will be described below.

(Light Guiding Plate)

The light guide plate of the present invention is preferably made of a material having high light transmissivity and moldability, such as acrylic resin, polycarbonate resin, amorphous polyolefin resin and polystyrene resin. While these materials to make the light guide plate have different refractive indices, materials having any values of refractive index can be used since the diffusion of light can be controlled by properly selecting the shape :of the notch or recess to be formed in the end face of light guide plate and the number thereof.

(LED Light Source)

For the LED light source of the present invention, one or more LED chips may be used. Light emitted by the LED chip may be caused to enter the light guide plate directly, or light of a wavelength different from that of the light emitted by the LED chip maybe caused to enter the light guide plate by combining the LED chip capable of emitting visible light and a phosphor capable of absorbing the visible light emitted by the LED chip and emitting visible light of a wavelength longer than that of the light absorbed.

Consequently, according to the present invention, mixed light having various color tones can be provided by a proper combination of the LED element and the fluorescent substance.

Now LED chips comprising a nitride semiconductor and is capable of emitting blue light, and yttrium-aluminum-garnet fluorescent substance activated with cerium will be described below for white light emitting LEDs that are in high demands for the use in back light of liquid crystal display or the like.

(LED Chip)

Various compound semiconductors made of nitride compounds (general formula: $In_iGa_jAl_kN$, wherein $0 \leq i$, $0 \leq j$, $0 \leq k$, $i+j+k=1$) such as InGaN and GaN doped with various impurities can be used for the LED chip, The LED chip is formed by growing a semiconductor such as InGaN or GaN as a light emitting layer on a substrate by MOCVD process or the like. The semiconductor may be of homojunction structure, heterojunction structure or double heterojunction structure that has MIS junction, PI junction or PN junction. The nitride semiconductor layer can be made for various wavelengths of light emission by selecting the materials and the mixed crystal composition. The semiconductor activation layer may also have single quantum well structure or multiple quantum well structure formed from a thin film wherein quantum effect takes place.

According to the present invention, the LED chip preferably includes a semiconductor light emitting layer capable of emitting blue light, and efficiently exciting the yttrium-aluminum-garnet fluorescent substance activated with cerium as will be described later.

(Fluorescent Substance)

An example of fluorescent substance that can be used in the surface light emitting device of the present invention is a photoluminescent fluorescent substance that emits light upon excitation by visible light or ultraviolet light. Specific examples of the photoluminescent fluorescent substance include yttrium-aluminum-garnet fluorescent substance activated with cerium that can emit white light by the combination of complementary color with the light emitted by the nitride semiconductor LED chip that is capable of emitting blue light. $Mg_5Li_6Sb_6O_{13}$:Mn, $Mg_2TiO_4$:Mn and other fluorescent substance, or a phosphor made by mixing such fluorescent substances may also be used.

Now the yttrium-aluminum-garnet fluorescent substance activated with cerium will be described below as a more preferable fluorescent substance.

In the present invention, the term "yttrium-aluminum-garnet fluorescent substance activated with cerium" is used in a broad sense so as to include fluorescent substances in which part or all of yttrium atoms are substituted by at least one element selected from a group consisting of Lu, Sc, La, Gd and Sm, or part or all of aluminum atoms are substituted by Ga or In, or both thereof.

More specifically, the photoluminescent fluorescent substance is one kind that is represented by general formula $(Y_zGd_{1-z})_3Al_5O_{12}$:Ce (wherein $0<z\leq 1$) or $(Re_{1-a}Sm_a)_3Re'_5O_{12}$:Ce (wherein $0\leq a<1$; Re is at least one selected from among Y, Gd, La and Sc; Re' is at least one kind selected from among Al, Ga and In).

EXAMPLES

Example 1

The surface light emitting device of the first example of the present invention is an example of using the light guide plate shown in FIG. 6 that is employed in the second embodiment. The light guide plate is made of polycarbonate by injection molding with a metal mold that is capable of forming two sets of eight notches 111a of pyramid shape each consisting of two planes arranged on the second principal plane (under surface) side of the end face of the light guide plate. The metal mold is also fabricated so that unevenness (emboss) is formed on the second principal plane of the light guide plate for improving the uniformity of light emission. The light guide plate is made by injection molding while melting polycarbonate at a temperature of 280° C. and setting the injection pressure to 1000 kgf/cm² and metal mold temperature to 100° C. The injection molding is taken out of the metal mold after cooling for 45 seconds. The light guide plate made in this process is provided with a reflecting sheet attached thereto except for the first principal plane (light emitting surface) through which optical output is extracted from the light guide plate and the end face through which light is introduced into the light guide plate. Mounted on the end face where the reflecting sheet is not attached is the LED light source having two LED chips made of a nitride semiconductor capable of emitting white light. When electric current flows in the LED chips of the surface light emitting device produced as described above, light is emitted to enter the light guide plate through the end face and provide surface light emission on the first principal plane of the light guide plate. The surface light emitting device as described above does not show abnormal light emission of localized high brightness and is capable of improving the luminance of light emission.

Example 2

The light guide plate was made of acrylic resin by injection molding with a metal mold capable of forming two sets, as in the first example, of three recesses of spherical shape as shown in FIG. 16 on the end face of the light guide plate under injection molding conditions of temperature of 250° C., injection pressure of 1100 kgf/cm², metal mold temperature 80° C. and cooling period of about 30 seconds. The surface light emitting device of the second example was formed similarly to the first example except for the conditions described above. When powered to flow electric current in the LED chips, the surface light emitting device produced as described above demonstrated improved luminance of light emission without showing abnormal light emission of localized high brightness. The surface light emitting device of the second example also showed high uniformity of light emission without chromatic aberration.

Example 3

The light guide plate was made of acrylic resin by injection molding with a metal mold capable of forming the light guide plate where adjacent notches are separate on the under surface of the light guide plate on the end face of the light guide plate as shown in FIG. 9, under injection molding conditions of temperature of 250° C., injection pressure of 1100 kgf/cm², metal mold temperature 80° C. and cooling period about 30 seconds. The surface light emitting device of the third example was formed similarly to the first example except for the conditions described above. When powered to flow electric current in the LED chips, the surface light emitting device of the third example showed surface light emission without abnormal light emission of localized high brightness, demonstrating improved luminance of light emission from portions at a distance from the incidence surface due to the flat surface being formed.

Example 4

The light guide plate was made of acrylic resin by injection molding with a metal mold capable of forming two sets, as in the first example, of nine pyramid notches of which planes change the angle thereof with the distance from the LED as shown in FIG. 10 on the end face of the light guide plate, under injection molding conditions of temperature of 250° C. injection pressure of 1100 kgf/cm², metal mold temperature 80° C. and cooling period of about 30 seconds. The surface light emitting device of the fourth example was formed similarly to the first example except for the conditions described above. When powered to flow electric current in the LED chips, the surface light emitting device of the fourth example shows improved luminance of light emission without showing abnormal illumination of localized high brightness. Corner of the incidence surface showed brighter than in the first example, and more uniform surface light emission can be obtained.

Example 5

The light guide plate is made of acrylic resin by injection molding with a metal mold capable of forming two sets, as in the first example, of six cylindrical notches as shown in FIG. 13 on the end face of light guide plate, under injection molding conditions of temperature of 300° C. injection pressure of 1500 kgf/cm², metal mold temperature 120° C. and cooling period about one minute. The surface light emitting device of the fifth example was formed similarly to the first example except for the conditions described above. When powered to flow electric current in the LED chips, the surface light emitting device of the fifth example shows good color mixing performance due to the curved side face of the notch, while improving the color uniformity, although there is some unevenness in the luminance.

Example 6

The light guide plate was made of acrylic resin by injection molding with a metal mold capable of forming two sets, as in the first example, of four cylindrical notches arranged in the longitudinal direction of the light guide plate while interposing the flat portion therebetween as shown in FIG. 14 on the end face of light guide plate, under injection molding conditions of temperature of 300° C. injection pressure of 1500 kgf/cm², metal mold temperature 120° C. and cooling period about one minute. The surface light emitting device of the sixth example was formed similarly to the first example except for the conditions described above. When powered to flow electric current in the LED chips, the surface light emitting device of the sixth example showed surface light emission with good color mixing performance due to the curved side face of the notch, while improving the color uniformity, although there is some unevenness in the luminance. Luminance of light emission is improved even at portions at a distance from the incidence surface due to the flat surface being formed.

Example 7

The light guide plate is made of acrylic resin by injection molding with a metal mold capable of forming two sets, as in the first example, of six notches having shape of circular cone as shown in FIG. 11 on the end face of light guide plate, under injection molding conditions of temperature of 220° C. injection pressure of 600 kgf/cm², metal mold temperature 50° C. and cooling period about 30 seconds. The surface light emitting device of the seventh example is formed similarly to the first example except for the conditions described above. When powered to flow electric current in the LED chips, the surface light emitting device of the seventh example shows surface light emission with good color mixing performance due to the curved side face of the notch, while improving the color uniformity, with improvement in unevenness in the luminance over that of the cylindrical notch.

Example 8

The light guide plate is made of acrylic resin by injection molding with a metal mold capable of forming two sets, as in the first example, of six recesses having a shape of circular cone truncated to remove the apex as shown in FIG. 12 on the end face of light guide plate, under injection molding conditions of temperature of 250° C. injection pressure of 1200 kgf/cm², metal mold temperature 80° C. and cooling period about 30 seconds. The surface light emitting device of the eighth example is formed similarly to the first example except for the conditions described above. When powered to flow electric current in the LED chips, the surface light emitting device of the eighth example shows surface light emission with good color mixing performance due to the curved side face of the notch, while improving the color uniformity, with improvement in unevenness in the luminance over that of the cylindrical notch.

Comparative Example

Figure 19:
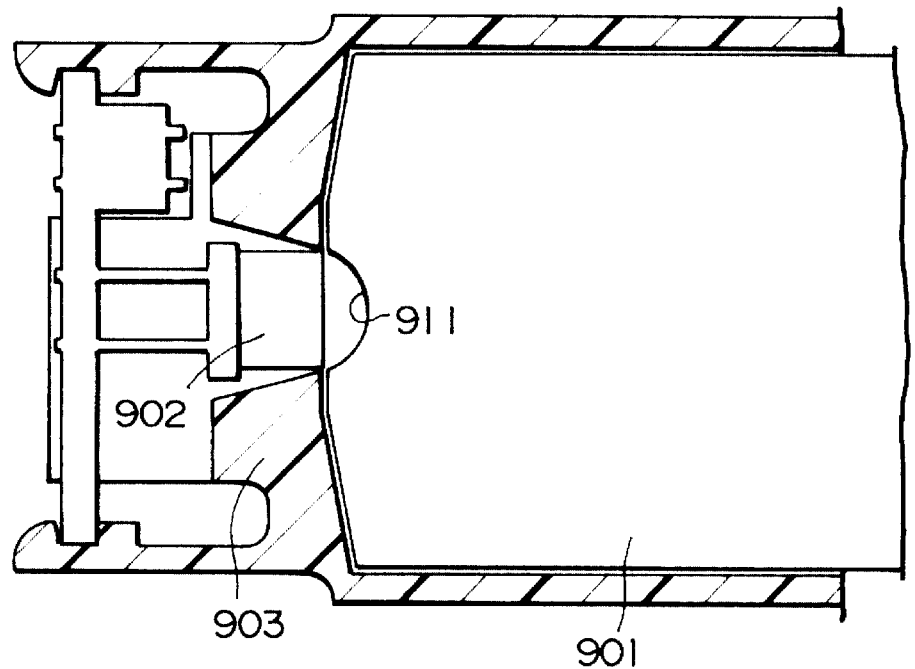
FIG. 19 is a plan view of the surface light emitting device of the prior art.
Figure 20A:
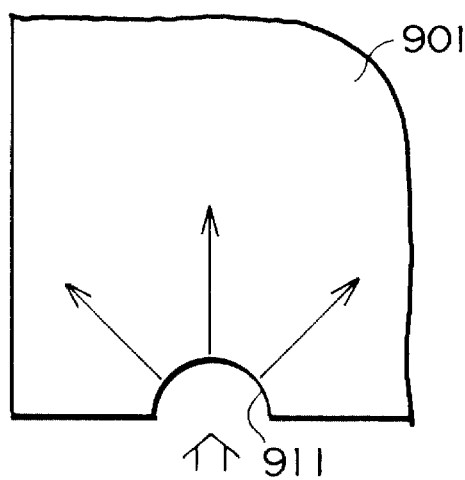
FIG. 20(a) is a schematic cross sectional view for explaining the refraction of light in the light diffusing portion of the surface light emitting device of the prior art.
Figure 20B:
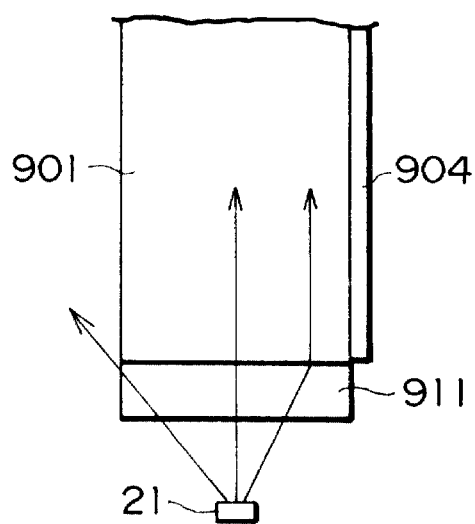
FIG. 20(b) is a schematic longitudinal sectional view for explaining the refraction of light in the light diffusing portion of the surface light emitting device of the prior art.

A surface light emitting device is made similarly to the Examples described above, except for the light guide plate having a cylindrical notch that makes contact with three surfaces of the end face of light guide plate, the first principal plane and the second principal plane as shown in FIG. 19 on the end face of light guide plate as the Comparative Example. When powered to flow electric current in the LED chips of the surface light emitting device of Comparative Example 1, light leaked through a gap generated between the LED and the notch formed on the first principal plane, resulting in abnormal illumination of localized high brightness and failing to achieve uniform surface light emission. Luminance of light emission was not sufficient in other portions.

As described in detail above, the surface light emitting device of the present invention is capable of causing light emitted by the LED element and incident on the light guide plate to emerge from the light guide plate uniformly with high luminance, and preventing abnormal illumination in the light emitting surface of the light guide plate.

What is claimed is:

1. A surface light emitting device comprising:
    a light guide plate having a top surface for emitting light and an under surface that opposes said top surface;
    a reflector on the under surface of said light guide plate and
    an LED light source comprising at least one LED element and disposed so that light emitted by the LED element is incident on at least one end face of said light guide plate,
    wherein said light guide plate comprises a light diffusing portion on one end face disposed so that light emitted from the LED light source enters the light guide plate while being diffused therein, said light diffusing portion having a top end spaced from the top surface.

2. The surface light emitting device according to claim 1;
    wherein said light diffusing portion has at least one notch made in a shape of half pyramid or half circular cone expanding downward from an apex on the one end face, said apex being located apart from the top surface.

3. The surface light emitting device according to claim 2;
    wherein said notch has a triangular pyramid shape.

4. The surface light emitting device according to claim 3;
    wherein said light diffusing portion has a plurality of notches for each LED element.

5. The surface light emitting device according to claim 4;
    wherein adjacent notches among the plurality of notches for each LED element are spaced from each other at the under surface of the light guide plate.

6. The surface light emitting device according to claim 4;
    wherein each notch has a configuration of a triangular pyramid having two inclined surfaces, and at least one of said notches has inclined surfaces having inclined angles different from that of another at least one of notches.

7. The surface light emitting device according to claim 6;
    wherein each inclined surface of said notches have an different angle with respect to the one end each other.

8. The surface light emitting device according to claim 1;
    wherein said light diffusing portion is formed so that the top end and the bottom end of said light diffusing portion are located away from the top surface and the under surface at the one end face.

9. The surface light emitting device according to claim 8;
    wherein a inner surface of said light diffusing portion is a curved surface.

10. The surface light emitting device according to claim 9;
    wherein a inner surface of said light diffusing portion is a spherical surface.

11. The surface light emitting device according to claim 9;
    wherein said light diffusing portion is made in a semi-cylindrical shape.

12. The surface light emitting device according to claim 1;
wherein said LED element is covered by a light transmitting resin.

13. The surface light emitting device according to claim 3;
wherein said LED element is covered by a light transmitting resin.

14. The surface light emitting device according to claim 6;
wherein said LED element is covered by a light transmitting resin.

15. The surface light emitting device according to claim 12;
wherein said light transmitting resin contains a phosphor that absorbs a light emitted by the light emitting element and emits visible light having a wavelength different from that of the light absorbed.

16. The surface light emitting device according to claim 15;
wherein said light emitting element is capable of emitting a visible light and said phosphor emits visible light having a wavelength longer than that of the light absorbed.

17. The surface light emitting device according to claim 15;
wherein said LED element has a nitride semiconductor and said phosphor consists of yttrium-aluminum-garnet activated with cerium.

18. The surface light emitting device according to claim 1;
wherein said LED light source is an LED bar light source having a surface located to oppose the one end face of said light guide plate and a light emitting portion that has a concave shape formed in the surface where the LED element is mounted and is filled with a light transmitting resin, said light emitting portion being located so that the light emerging surface of said light emitting portion oppose to said light diffusing portion.

19. The surface light emitting device according to claim 3;
wherein said LED light source is an LED bar light source having a surface located to oppose the one end face of said light guide plate and a light emitting portion that has a concave shape formed in the surface where the LED element is mounted and is filled with a light transmitting resin, said light emitting portion being located so that the light emerging surface of said light emitting portion oppose to said light diffusing portion.

20. The surface light emitting device according to claim 6;
wherein said LED light source is an LED bar light source having a surface located to oppose the one end face of said light guide plate and a light emitting portion that has a concave shape formed in the surface where the LED element is mounted and is filled with a light transmitting resin, said light emitting portion being located so that the light emerging surface of said light emitting portion oppose to said light diffusing portion.

21. The surface light emitting device according to claim 18;
wherein said LED bar light source has a plurality of light emitting portions.

22. The surface light emitting device according to claim 18;
wherein said light transmitting resin contains a phosphor that absorbs a light emitted by the light emitting element and emits visible light having a wavelength different from that of the light absorbed.

23. The surface light emitting device according to claim 22;
wherein said light emitting element is capable of emitting a visible light and said phosphor emits visible light having a wavelength longer than that of the light absorbed.

24. The surface light emitting device according to claim 23;
wherein said light emitting portion emits a white light generated by mixing the light emitted by LED element and the light emitted by the phosphor.

25. The surface light emitting device according to claim 22;
wherein said LED element has a nitride semiconductor and said phosphor consists of yttrium-aluminum-garnet activated with cerium.

26. The surface light emitting device according to claim 18;
wherein said light emitting portion emits a white light generated by mixing the light emitted by LED element and the light emitted by the phosphor.

27. A light guide plate for a surface light emitting device comprising:
a top surface for emitting light,
an under surface that opposes said top surface,
at least one end face on the light guide plate positioned between said top surface and said under surface, said end face having a light diffusing portion thereon so that incident light enters the light guide plate and is diffused therein,
wherein said light diffusing portion has at least one notch expanding in the direction of said under surface.

28. The light guide plate according to claim 27,
wherein said at least one notch is made in a shape of half pyramid or half circular cone.

29. A liquid crystal display comprising said surface light emitting device according to claim 1.

* * * * *

UNITED STATES PATENT AND TRADEMARK OFFICE
CERTIFICATE OF CORRECTION

PATENT NO. : 6,601,962 B1
DATED : August 5, 2003
INVENTOR(S) : Munetsugu Ehara et al.

It is certified that error appears in the above-identified patent and that said Letters Patent is hereby corrected as shown below:

<u>Title page,</u>
Item [57], ABSTRACT,
Line 6, change "an LED" to -- a LED --

<u>Column 16,</u>
Line 17, change "an" to -- a --,
Line 20, change "an LED" to -- a LED --,
Lines 59 and 63, change the first "a" to -- an --, <u>Column 17,</u>
Lines 33, 43 and 65, change "an LED" to -- a LED --, <u>Column 18,</u>
Line 41, change "an" to -- a --.

Signed and Sealed this

Fourth Day of November, 2003

JAMES E. ROGAN
*Director of the United States Patent and Trademark Office*